United States Patent [19]

Rando

[11] Patent Number: 4,880,990

[45] Date of Patent: Nov. 14, 1989

[54] OPTICAL LIQUID-LEVEL SENSING APPARATUS

[75] Inventor: Joseph D. Rando, Dudley, Mass.

[73] Assignee: Imo Industries, Inc., Princeton, N.J.

[21] Appl. No.: 205,932

[22] Filed: Jun. 13, 1988

[51] Int. Cl.⁴ .......................................... G01N 21/41
[52] U.S. Cl. ..................................... 250/577; 73/293; 250/227
[58] Field of Search .................. 250/227, 577; 73/293; 340/619

[56] References Cited

U.S. PATENT DOCUMENTS

| | | | |
|---|---|---|---|
| 4,187,025 | 2/1980 | Harmer | 250/577 |
| 4,240,747 | 12/1980 | Harmer | 250/227 |
| 4,355,238 | 10/1982 | Ruell | 73/293 |
| 4,637,729 | 1/1987 | Schoch | 250/227 |

*Primary Examiner*—Edward P. Westin
*Attorney, Agent, or Firm*—Hopgood, Calimafde, Kalil, Blaustein & Judlowe

[57] ABSTRACT

An optical sensor element provides cantilevered support of a bent length of glass-rod core of first refractive index having a cladding of second refractive index that is less than the refractive index of the core, and wherein the outer radius of the bend (which may be a single bend, or a plurality of spaced bends) is at least the diameter of the cladded core. Provision is made at the respective ends of the cladded core for completing a light circuit via the length of the cladded core, and flexible leads, as of multi-mode optical fiber, enable completion of the optical circuit to a remotely located control unit having an electrically powered light source and a photodetector, at the respective ends of the circuit. Provision of threshold-operated circuitry at the control unit enables automatic electronic evaluation (and further-remote output delivery) of signals which reflect (a) one or more detected light levels, (b) interface level between two mingled liquids having different specific gravity, and (c) the monitored integrity of the optical circuit as a whole.

24 Claims, 3 Drawing Sheets

OPTICAL LIQUID-LEVEL SENSING APPARATUS

BACKGROUND OF THE INVENTION

The invention relates to use of optical circuitry to detect liquid level by sensing whether an optical component of the circuitry is or is not currently immersed in the liquid. More particularly, the invention is concerned with the nature and structure of the involved optical component.

Prior and present liquid-level sensing and measurement have relied on magnetic-reed switch technology, wherein a float carries one or more magnets to create a magnetic field which rises and falls with liquid level, and one or more reed switches at fixed elevations along the path of float movement respond to proximity of the magnetic field as the float tracks instantaneous liquid level, by providing on/off switch action in an electrical circuit.

Pending U.S. patent application Ser. No. 146,196, filed Jan. 28, 1988 discloses generally similar magnetic-reed constructions wherein an optical circuit is either continuous, or partially or completely broken, depending upon the actuated or unactuated condition of the magnetic-reed structure.

The foregoing devices involve moving parts and are therefore subject to a degree of degraded performance in the presence of any vibration in their environment, and even though the magnetic-reed switch may be hermetically sealed, it must still function with associated electrical conductors, connections and components, thus presenting a potential hazard in the circumstance of monitoring the level of stored inflammable liquids as in a tanker for petroleum products.

BRIEF STATEMENT OF THE INVENTION

It is an object of the invention to provide improved means of detecting liquid-level.

It is a specific object to achieve the foregoing object, without moving parts and without exposing any electrical component to the volume within which liquid level is to be measured or detected.

Another specific object is to achieve the above objects by total reliance upon optical circuitry, not only within the volume in which liquid level is to be determined but also for a relatively great radius of area surrounding said volume.

It is also a specific object to additionally provide for continuous monitoring of the integrity of the entire optical circuit whether any part of this circuit is or is not currently exposed to the liquid for which level is to be determined.

It is a general object to meet the above objects with apparatus that is of relatively low initial cost, that is essentially maintenance-free, and that is characterized by inherently superior performance, even in the presence of a vibratory environment.

The invention meets the above objects in a sensor element which provides cantilevered support of a bent length of glass-rod core of first refractive index having a cladding of second refractive index that is less than the refractive index of the core, and wherein the outer radius of curvature of the bend (which may be a single bend, or a plurality of spaced bends) is at least the diameter of the cladded core. Provision is made at the respective ends of the cladded core for completing a light circuit via the length of the cladded core, and flexible leads, as of multi-mode optical fiber, enable completion of the optical circuit to a remotely located control unit having an electrically powered light source and a photodetector, at the respective ends of the circuit. Provision of threshold-operated circuitry at the control unit enables automatic electronic evaluation (and further-remote output delivery) of signals which reflect (a) one or more detected liquid levels, (b) interface level between two mingled liquids having different specific gravity, and (c) the monitored integrity of the optical circuit as a whole.

DETAILED DESCRIPTION

The invention will be described in detail in conjunction with the accompanying drawings, in which:

FIG. 4 being for the case of environmental exposure other than to a liquid, and FIG. 5 being for the case of immersion in a liquid;

Figure 1:
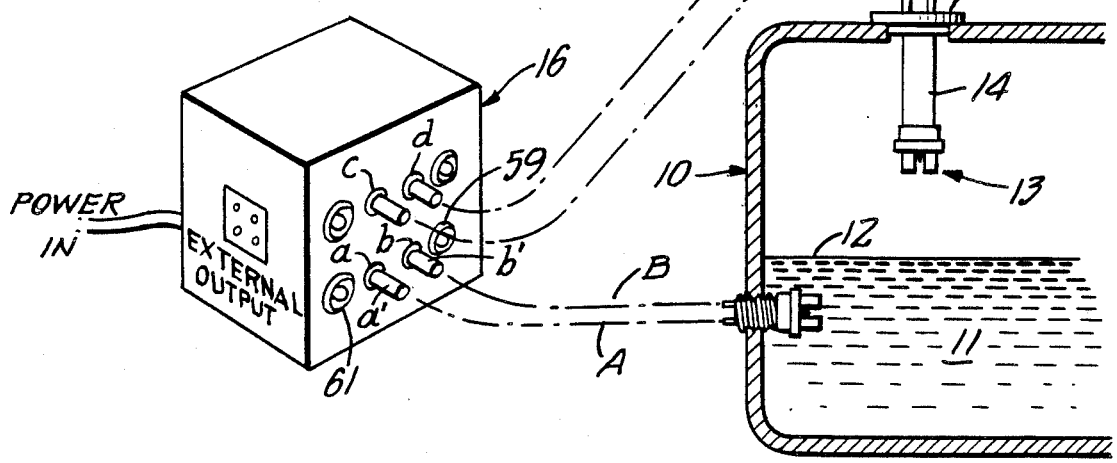
FIG. 1 is a simplified overall view of a container of liquid contents equipped with liquid-level sensing means of the invention, together with a remotely located control unit therefor.

In FIG. 1, a container 10 of liquid contents 11 is equipped with a first optical liquid-level sensor element 12 mounted to a vertical wall of the container, and a second optical liquid-level sensor element 13 is carried at the lower end of a suspension stem 14 having an upper flange 15 that is removably fitted to an opening in the upper wall of the container. The lower sensor element 12 is immersed in liquid 11, and the upper sensor element 13 is above the liquid level.

A remotely located control unit 16 has separate receptacles a, b for removable reception of jacks a', b' at the remote end of separate flexible light-conducting lines A, B, which may be commercially available multi-mode optical fibers. The other ends of lines A, B are separately and optically coupled to sensor 12, and similar flexible light-conducting lines C, D couple sensor 13 to further receptacles c, d at control unit 16. As suggested by legend in FIG. 3, the line A to level sensor 12 is supplied with light from a source 20, which may be a light-emitting diode (LED); and light returning from sensor 12 in line B is converted into an electrical signal by photoelectric means 21, which may be a PIN photodiode detector. Separate but similar source and detector elements, not shown, but within control unit 16, will be understood to similarly serve lines C, D to and from sensor 13.

Figure 2:
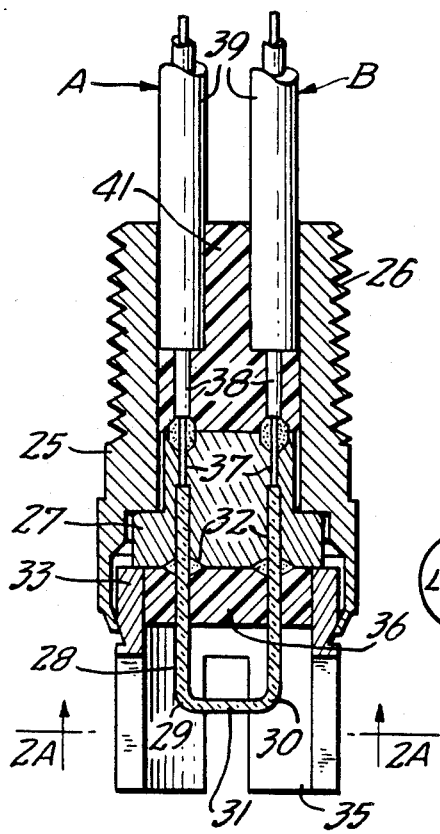
FIG. 2 is an enlarged view in longitudinal section of an optical sensing element of FIG. 1.
Figure 2A:
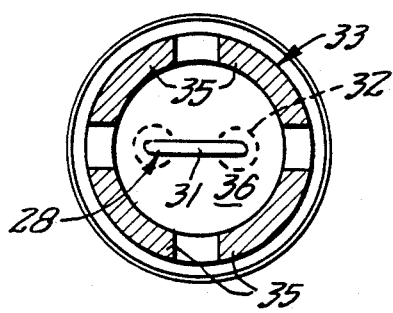
FIG. 2A is a sectional view taken at 2A—2A in FIG. 2.

The optical level-sensing element of FIGS. 2 and 2A is representative of construction employed at 12 and 13 in FIG. 1. A generally tubular housing 25 (as of brass)

has external threads 26 at its mounting end, and a flanged plug 27 (also as of brass) permanently mounts the respective straight ends of a light-conducting cladded glass core rod 28 (to be later described) having two like bends 29, 30 that are spaced by a straight section 31. Each of the ends of rod 28 is fitted to a separate counterbore in plug 27 and is permanently retained by cementings 32. A tubular bushing 33 (also as of brass) compressionally loads the flange of plug 27 to seated relation within a counterbore in housing 25, being thus permanently retained by the inwardly swaged lower lip 34 of housing 25. The lower end of bushing 33 is slotted to define four arcuate fingers 35, in interrupted circumferential array, surrounding the downwardly cantilevered doubly-bent formations 29, 30, 31 of rod 28, said formations being thus protected against the shock of direct mechanical impact, but nevertheless exposed for freely floodable liquid immersion. A plastic potting 36 (as of an epoxy material) completes a seal of bushing 33 to plug 27 and provides an enhanced base support for the lower cantilevered formations of rod 28. This potting 36 is at axial offset above the slots of bushing 33 and, therefore, in no way interferes with free-flooding liquid access to the cantilevered formations 29, 30, 31 of rod 28.

To complete a description of the sensor-element assembly of FIG. 2, it is noted that lines A and B are identical, being shown to comprise a multimode light-conducting core 37, with suitable cladding 38 and a protective sheath 39. Both of lines A and B enter the bore of housing 25 in axial alignment with the respective ends of rod 28, the core 37 of each line (A, B) being fitted to reduced parallel bores in plug 27 and retained by cementings 40 in optically coupled relation with the respective ends of rod 28. A potting 41 (again as of an epoxy material) permanently seals and anchors the sheaths and claddings of both lines A and B within the bore of housing 25.

Figure 4:
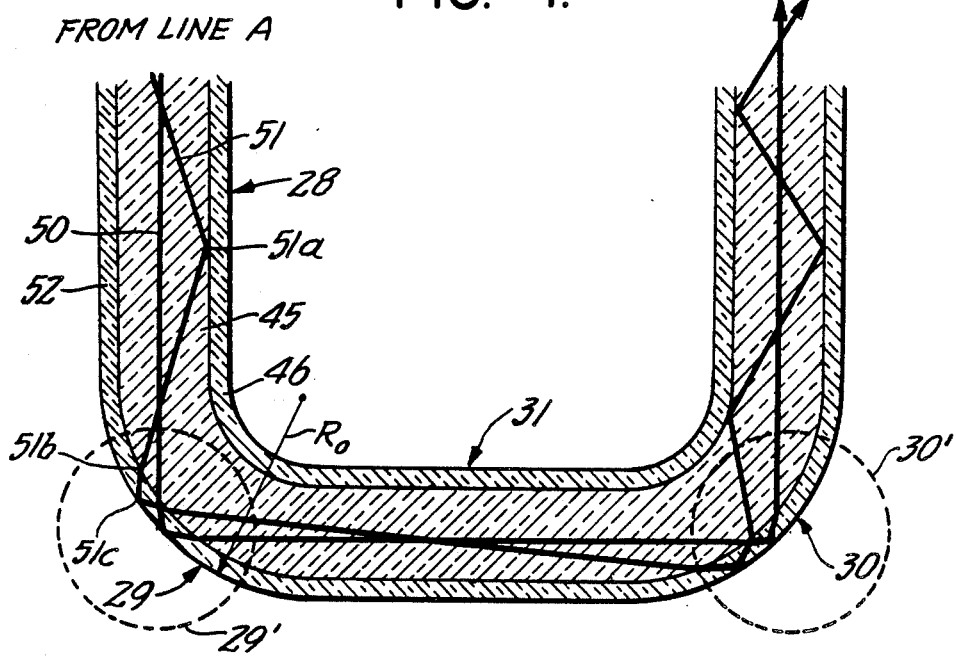
FIGS. 4 and 5 are very much enlarged sectional views of the level-sensitive portion of the optical sensing element of FIG. 2, the section being taken in a plane which includes the optical axis of said element.

Attention is now directed to FIG. 4 for a greatly enlarged view of the optically operative rod formations 29, 30, 31 which are at cantilevered projection from the base-anchoring structure described in connection with FIG. 2. First of all, rod 28 is seen to comprise a glass core 45 and a circumferentially continuous cladding 46 which which may also be of glass but which has an index of refraction that is less than the refractive index of the core 45. Rod 28 is preferably formed from elongate straight stock that is suitably clad and cut to desired length, and the bends 29, 30 are produced by microblowtorch application to locally soften the stock for bending around a contoured upstanding forming jig; the commercial product known as Cladrod, available from Applied Fiber Optics, of Southbridge, MA, is satisfactory stock from which to fabricate doubly-bent rod 28.

Recalling that the optical fiber 37 within lines A and B is of multimode character, the light transmitted in line A and coupled to one of the ends (in FIG. 4, the leftward end) of rod 28 will involve a complex of ray paths which, in addition to axially central and other straight rays 50 parallel to the axis of entry into the left end of rod 28, will be on zig-zag courses (exemplified by ray 51) due to internal reflection at interface between core material 45 and cladding material 46; such an internal reflection is seen at 51a in the straight left leg supplied with light from line A. But when the internally reflected ray 51 reaches the opposite side of core 45, namely at location 51b, ray 51 has encountered the core/cladding interface at the bend 29 and therefore at such greater local incidence to this interface as to traverse the same, albeit at reduced incidence within the cladding material 46, due to the lesser refractive index of the cladding. Upon traversal of the cladding, ray 51 encounters the cladding-to-air interface at 51c and is there reflected for another traverse of the cladding, due to the substantial difference in index of refraction between that of the cladding and that of air. In FIG. 4, the zig-zagging ray 51 is seen to be internally reflected by the glass-to-glass interface as long as it has incidence with a straight course of rod 28, and at bends 29 and 30, the full containment of ray 51 is further assured for incidences at the air-to-cladding interface; and it is further seen in FIG. 4 that axially parallel entering rays, such as ray 50, are also retained within the cladded rod, due to the incidence-reducing action of interface-52 traversal within bends 29, 30 and to the relatively great refractive-index difference at the cladding-to-air interface. The critical regions of such ray containment, for the air-environment situation, are suggested by phantom circles 29', 30' at the respective bends 29, 30. The net result for the air-environment situation is to return via line B to the photodetector 21 a maximum possible of all of the light-source energy delivered by line A to the bent rod 28.

Figure 5:
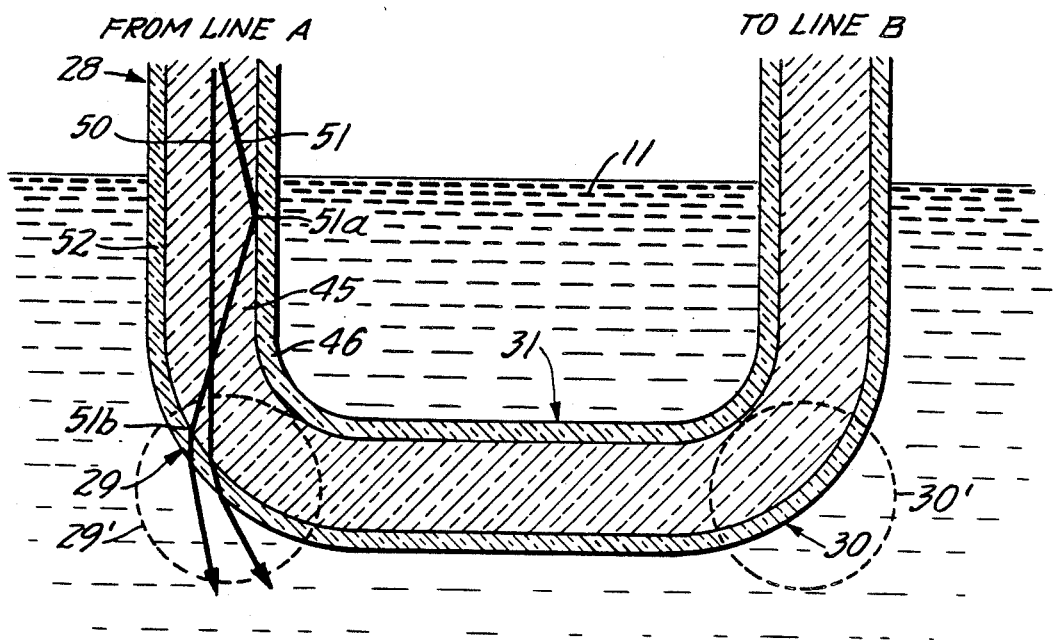

FIG. 5 depicts the same rod 28 when exposed to the liquid environment of container contents 11, as is the case of sensor 12 in FIG. 1. At the region 29' of bend 29, both the parallel rays (e.g. 50) and the internally reflected rays (e.g. 51) encounter the cladding-to-liquid interface with such relatively small refractive-index difference that all or substantially all of the incoming rays 50, 51 exit rod 28 (as shown), being then dissipated in the liquid medium 11; and if any rays survive rod 28-containment past bend 29, they will be in greatly reduced number, being even further reduced by the same kind of action at the cladding-to-liquid interface within bend 30. The net result, for the depicted liquid-immersion situation is to substantially cut off light return via line B, unless and until the level of liquid 11 in container 10 drops sufficiently to once more expose rod 28 to a non-liquid (e.g., air) environment.

Figure 6:
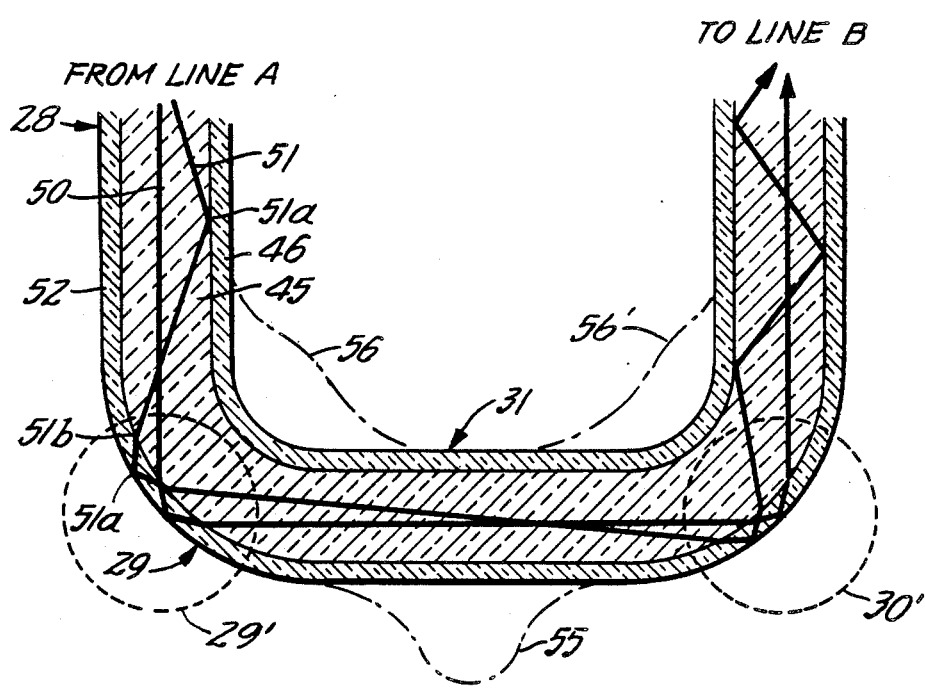
FIG. 6 is a view similar to FIG. 4, for the case of environmental exposure other than to a liquid, following immersion in a liquid.

FIG. 6 illustrates the FIG. 4 situation of a non-liquid (e.g. air) exposure, (1) when the doubly-bent sensing rod 28 is downwardly suspended (as in the case of sensor 13 threaded engaged to the bore of stem 14 in FIG. 1), and (2) when the level of liquid 11 has been reduced to free the sensor element 28 from liquid immersion of its connected bend formations 29, 30, 31. In this situation, the outer surface of element 28 is still wet with remaining liquid. The viscosity of the liquid will determine the time it takes to release all droplets formed by gravitational action on the remnant liquid, but surface tension of the liquid will cause all droplets to form and release from rod 28 at the generally central region of the straight connection 31 between bends 29, 30. This action is suggested by a phantom outline 55 which represents such a droplet in the course of formation. Also, phantom outlines 56, 56' in the respective inside corners of bends 29, 30 illustrate the action of surface tension and gravity to draw remnant liquid from the respective parallel legs of rod 28 and in the central and downward direction of enhancing the droplet formation at 55. When the mass of the accumulation at 55 exceeds the retaining action of surface tension, a droplet will release at 55, and the cycle of central droplet formation will repeat, as long as necessary to dispose of remnant liquid on rod 28. Significantly, by having thus caused all liquid to release from the central region of straight section 31, it follows that liquid will be drawn away from exposure to the outer radius of each of the bends 29, 30, so that a clean non-liquid exposure of this outer-radius region exists virtually immediately after liquid level recedes from immersion of bends 29, 30. Since this critical outer-radius region is clean, the optical performance described for FIG. 4 is almost immediately available, and the potential for error due to remnant-liquid adherence to the outer-radius region is minimal, or non-existent, depending on the viscosity of the involved liquid.

Figure 6A:
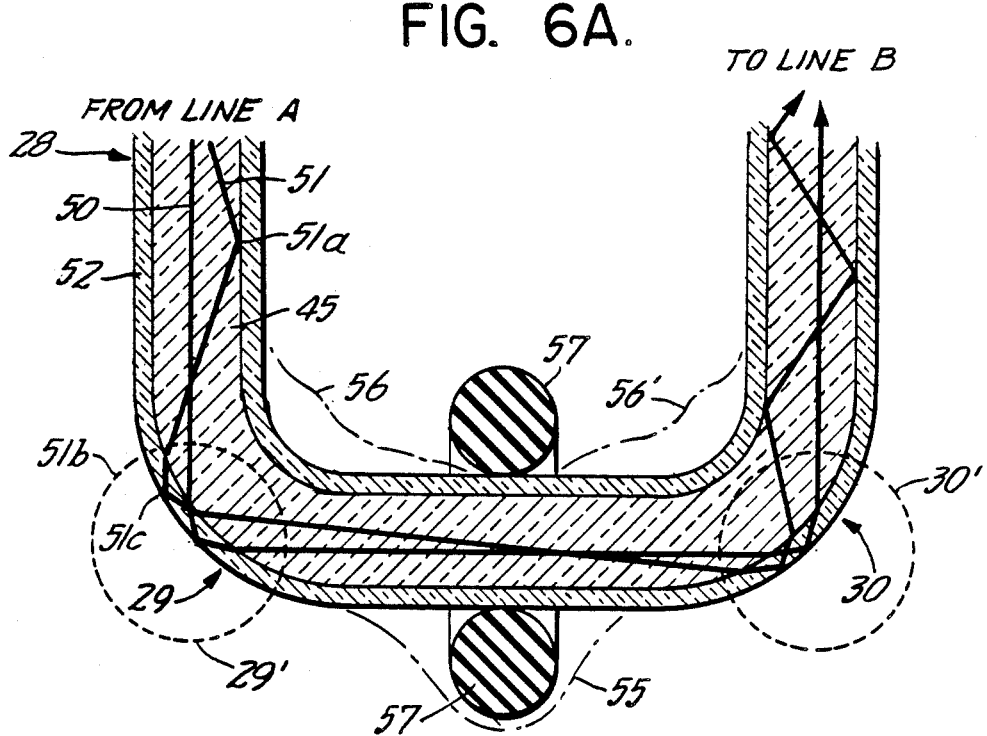
FIG. 6A is a view similar to FIG. 6, to show a modification.

For the situation in which the plane of the doubly bent rod 28 is not vertical, e.g., for the case of sensor 12 in FIG. 1 where the plane of the doubly-bent rod 28 is horizontal, the natural gravity action of droplet formation cannot be as described for the vertical-plane orientation of sensor 13. However, to meet the problem of horizontal-plane orientation for the sensor 12, FIG. 6A shows the addition of a circumferential collar 57 around the central region of straight section 31. Although FIG. 6A is drawn for the same vertical-plane orientation that was adopted for FIGS. 4, 5 and 6, it will be appreciated that when the light path in bent rod 28 is horizontally oriented, the collar 57 remains to provide the lowermost elevational extreme of the rod/collar assembly. Thus, even when horizontally oriented, collar 57 is operative to induce droplet formation only from collar 57, relying upon surface tension of the liquid, in conjunction with gravity action, to draw remnant liquid from both legs of rod 28 and toward the collar 57. Suitably, collar 57 may be an elastomeric O-ring in circumferentially tensed frictional engagement with the central region of straight section.

Figure 3:
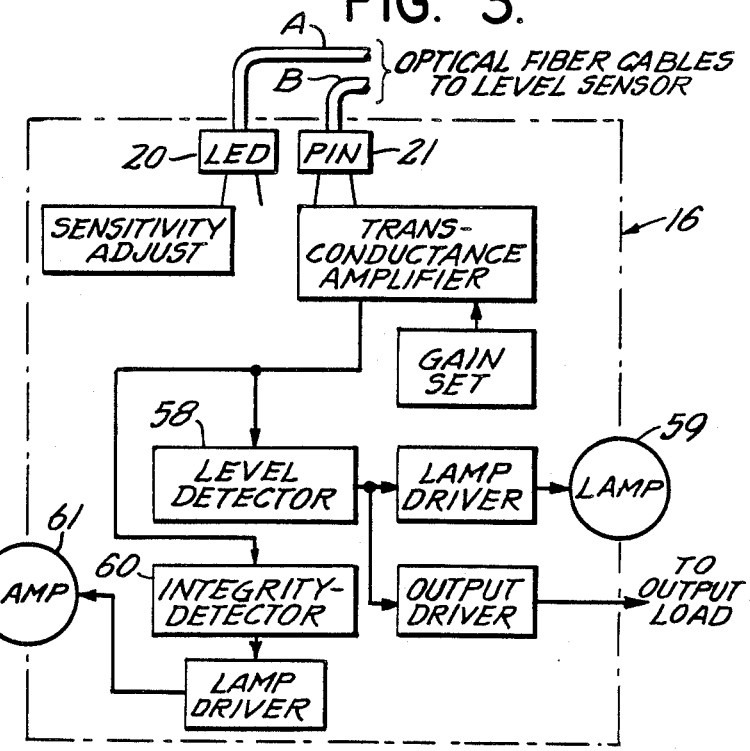
FIG. 3 is an electrical block diagram of components within the control unit of FIG. 1.

Returning once more to FIG. 3, circuitry is schematically shown, within control unit 16, for servicing the respective lines A, B which complete the optical circuit through sensor 12. For simplicity, power-supply connections are omitted, the same being merely suggested by legend in FIG. 1; also, for simplicity, the electronic components for servicing the respective lines C, D are not shown, since they duplicate what is shown in FIG. 3. Legends in FIG. 3 indicate provision for sensitivity adjustment of the LED light source 20 and gain-set adjustment for a transconductance amplifier which processes the output of photodetector 21 to a "Level Detector" 58. This detector 58 will be understood to be a first threshold circuit, which is set to produce an output signal when the light signal detected at 21 indicates little or no loss of the light intensity emanating from source 20, meaning that the non-immersion condition of FIG. 4 is indicated. Such a signal above threshold at 58 is shown to produce (1) an output to a lamp driver for illumination of an indicator lamp 59, visible at the front panel of control unit 16, and (2) an output to an output driver, as for further-remoted actuation of other apparatus that must be coordinated with detected freedom of sensor 12 from liquid immersion. Of course, when liquid level is sufficiently restored to again immerse the refraction-sensitive element 28 of sensor 12, most of the light from source 20 will escape rod 28 at the first and second bends (29, 30) if not at the first bend 29, and photodetector 21 will fail to produce an output signal sufficient to exceed threshold at level detector 58, thereby causing indicator lamp 59 to extinguish.

It should be explained that, for the liquid-immersed condition, even though most of the light from source 20 departs from the bend regions of rod 28, a small residuum of this light remains as internally reflected light and, therefore, exits rod 28 with return transmission in line B to the photodetector 21. The magnitude of this relatively small residuum will depend upon a number of factors, such as: bend radius (i.e., radius of curvature) as a function of core 45 diameter, numerical aperture of rod 28 (i.e., the standardized expression for the relation of refractive index of cladding 46, with respect to refractive index of core 45), and the index of refraction of the liquid (or liquids) to which the sensor (12 or 13) is expected to respond, as described in connection with FIGS. 4 and 5. The important point is that photodetector 21 is always exposed at least to this residuum, and that an "Integrity Detector" 60 connected to the photodetected output is able to develop an output signal to another lamp driver for illuminating a second lamp 61. Suitably, detector 60 may be another threshold circuit, set for response to produce an output to the driver for lamp 61, as long as a predetermined minimum residuum light intensity is detected at 21, thus expressly indicating fidelity of the optical circuit regardless of whether the sensitive element 28 of sensor 12 is or is not liquid-immersed.

The discussion thus far has been in general terms, and it is desired to provide illustrative applicable numerical data. The glass core 45 of cladded rod 28 is of diameter within the range of 50-microns to 12.5 mm., and the numerical aperture of * the cladded rod is in the range 0.2 to 0.8. The outer radius of curvature ($R_o$) of the bend, at 29 and at 30, is in the range of one to ten times the diameter of the cladded core. The arcuate extent of each of the bends happens to be 90 degrees ($\pi/2$ radius) in the form described, but greater and lesser arcuate extents in the range ±50 percent from the described angle may be employed for particular level-discriminating purposes. Generally speaking, the shorter the outer radius of curvature of the bend, the more likely it is that the sensor is a clear on/off detector of liquid immersion vel non, and the greater the outer radius of curvature of the bend, the more likely it is that traverse of more than one interface will be detectable, along with the integrity-detection feature described above; thus, for a container 10 holding a mingled two liquids having different specific gravities (e.g. an oil stratum interfacing a water stratum), the difference in refractive index as between the upper stratum and the lower stratum will be sufficient to enable threshold discrimination for differently quantized photodetector (21) output intensities, thus enabling recognition at control unit 16 that sensor immersion is in one or in the other of the two liquid strata.

*

Numerical aperture is the sine of the half-angle of the cone of light exiting an aperture.

In one specific example wherein integrity monitoring is a clearly obtained feature in addition to the described liquid-level measurement involved in immersion versus non-immersion of rod bends in liquid, the sensor rod 28 is of Cladrod, having an outer diameter of 0.025 inch, and having a numerical aperture of 0.66. The outer radius of bends 29, 30 is about 3 to 4 times the diameter of the rod. And lines A, B each comprise a single-strand 50-micron core of monomode fiber, for which the clad outer diameter is 125 microns. The ability to discriminate (in the photodetector output) for different environmental conditions of sensitive-element exposure exists for at least four conditions:

for highest detected optical signal, zero db down;
for intermediate detected optical signal, −4db;

for lowest detected optical signal (e.g. integrity monitoring), −8 db;

for zero signal detection, an indication of optical line-integrity failure.

Figure 7:
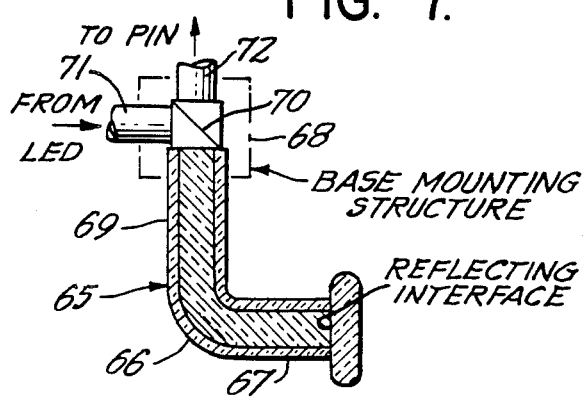
FIG. 7 is another enlarged sectional view, to show another embodiment of the invention.

While the invention has been described in detail for a preferred embodiment, it will be understood that modifications may be made without departing from the invention. For example, FIG. 7 specifically shows a liquid-level-sensitive sensor element 65 having but a single bend 66 and terminated at the end of its straight section 67 (after bend 66) with a reflecting interface, identified by legend. In the base-mounting structure 68 for the single cantilevered leg 69 of element 65, a beam splitter 70 segregates incoming LED light (at port 71) from exiting light via port 72 to the photodetector 21. The reflection at end of section 67 effectively folds the light circuit, and the bend 66 serves light rays in both directions. In the case of liquid immersion, most of these rays will exit the sensor, as a result of first and, if necessary, second encounter with bend 66, and the beam splitter 70 assures separate treatment of outgoing and returning light via the respective flexible lines A, B.

What is claimed is:

1. As an article of manufacture, a sensor element for mounting to a container to make an optical measurement of a particular level of liquid in the container, said sensor element comprising a tubular base housing having external means of fixed mounting to the container, said housing having an inner end for liquid exposure and an outer end for external communication of liquid-level intelligence, an elongate length of glass core of first refractive index with a cladding of second refractive index that is less than said first refractive index, said length having at least one bend exposed for liquid contact at the inner end of said housing, there being at least some straight extent of the cladded core with tangential continuity to the respective limits of said at least one bend, said straight extent attracting droplet formation away from said bend, said length otherwise extending in sealed relation within said housing, the outer radius of curvature of said bend being at least the diameter of the cladded core, and means at the respective ends of said length for completing a light circuit through said length.

2. The article of claim 1, in which the outer radius of curvature of said bend is in the range of one to ten times the diameter of the cladded core.

3. The article of claim 1, in which the outer radius of curvature of said bend is in the range of two to three times the diameter of the cladded core; whereby, with said bend in air, a light circuit can be completed through said length but will be substantially incomplete via said length when said bend is immersed in a liquid.

4. The article of claim 1, in which the outer radius of curvature of said bend is in the range of three to ten times the diameter of the cladded core; whereby, with said bend in air, a light circuit can be completed through said length and, with said bend immersed in a liquid, light transmission via said length will be reduced sufficiently to identify both the fact of liquid immersion and the integrity of the light circuit.

5. The article of claim 1, in which the outer radius of curvature of said bend is in the range of five to ten times the diameter of the cladded core; whereby, with said bend in air, a light circuit can be completed through said length and, with said bend immersed in a pool of two liquids of different specific gravity wherein the liquids define a separation interface, light transmission via said length will be sufficiently and differently reduced when immersed in either of the liquids to enable identification of the particular liquid in which it is currently immersed, thereby enabling identification of the instantaneous level of the interface between the two liquids.

6. The article of claim 2, in which the glass core is of diameter in the range 50 microns to 12.5 mm., and in which the numerical aperture of the cladded core is in the range 0.2 to 0.8.

7. The article of claim 6, in which the glass core is of approximately 0.025-inch diameter, and in which the numerical aperture is approximately two thirds.

8. The article of claim 1, in which said bend is one of two such bends, said bends being spaced from each other by a straight portion of said length.

9. The article of claim 8, in which said bends are each to the extent of substantially $\pi/2$ radians and in which the ends of said length are in spaced substantially parallel relation.

10. The article of claim 1, in which one of the ends of said length is terminated by a reflector, and in which beam-splitting means is coupled to the other end of said length, whereby light entering said core may be segregated from light exiting said core.

11. The article of claim 1, wherein said bend is at cantilevered offset from the sealed region within said base housing.

12. The article of claim 8, wherein said bends are at cantilevered offset from the sealed region within said base housing.

13. The article of claim 10, wherein said bend and said reflector are at cantilevered offset from the sealed region within said housing.

14. The article of claim 13, in which said beam-splitting means is additionally mounted by said base housing.

15. The article of any one of claims 11 to 14, in which said base housing includes floodable rigid means spaced from and surrounding the cantilevered portion of said length.

16. The article of any one of claims 11 to 14, in which flexible means including two light-conducting elements for separate light-transmission to and light-transmission from said article are coupled at one end to the cladded core.

17. A liquid-level measuring system comprising (a) a sensor element for mounting to a container for making an optical measurement of a particular level of liquid in the container, and (b) a remote control unit for said sensor element; said sensor element comprising a tubular base having external means of fixed mounting to the container, said housing having an inner end for liquid exposure and an outer end for external communication of liquid-level intelligence, an elongate length of glass core of first refractive index with a cladding of second refractive index that is less than said first refractive index, said length having at least one bend exposed for liquid contact at the inner end of said housing, there being at least some straight extent of the cladded core with tangential continuity to the respective limits of said at least one bend, said straight extent attracting droplet formation away from said bend, said length otherwise extending in sealed relation within said housing, the outer radius of curvature of said bend being at least the diameter of the cladded core, said control unit including a light source and a light detector; and flexible means including two light-conducting elements which are respectively coupled at one end to said light source and to said detector, and which are respectively coupled at the other end to said cladded core.

18. The system of claim 17, in which said remote control unit includes threshold-responsive means operative to produce an output signal upon detector response below threshold.

19. The system of claim 18, in which said threshold responsive device is one of a plurality each of which produces an output signal for a different level of detector response below threshold.

20. The system of claim 18, in which said article of claim 1 is one of two such articles each of which is mounted for bend exposure to a different liquid level, and in which said threshold-responsive means and said flexible means are each coupled to serve a different one of the said two articles.

21. The system of claim 17, in which the couplings of said light-conducting elements to said light source and to said detector are selectively detachable.

22. As an article of manufacture for use in optical measurement of liquid level, a sensor element comprising an elongate length of glass core of first refractive index with a cladding of second refractive index that is less than said first refractive index, said length having two spaced bends intermediate the ends of said length, said bends being spaced from each other by a straight portion of said length, the outer radius of curvature of said bend being at least the diameter of the cladded core, means at the respective ends of said length for completing a light circuit through said length, and an elastomeric O-ring in stressed circumferentially continuous engagement with the cladded core at substantially the mid-point of the straight portion between said bends.

23. The system of claim 17, in which each of said flexible light-conducting elements is a multi-mode optical fiber.

24. The article of claim 10, in which said reflector is generally circular and of diameter exceeding the diameter of said cladded core.

* * * * *